United States Patent
Hernandez

(10) Patent No.: US 8,709,991 B2
(45) Date of Patent: Apr. 29, 2014

(54) SILICAS AND ALKALI METAL SALT COMPOSITIONS, DETERGENTS FORMED FROM SUCH COMPOSITIONS AND METHOD OF FORMING SUCH COMPOSITIONS AND DETERGENTS

(75) Inventor: Enrique Hernandez, Brownsville, TX (US)

(73) Assignee: Paben Proyectos Estrategicos, S.A. de C.V., San Pedro Garza Garcia, Nuevo Leon (MX)

( * ) Notice: Subject to any disclaimer, the term of this patent is extended or adjusted under 35 U.S.C. 154(b) by 0 days.

(21) Appl. No.: 13/260,631

(22) PCT Filed: Apr. 5, 2010

(86) PCT No.: PCT/US2010/029904
§ 371 (c)(1),
(2), (4) Date: Sep. 27, 2011

(87) PCT Pub. No.: WO2010/117925
PCT Pub. Date: Oct. 14, 2010

(65) Prior Publication Data
US 2012/0021966 A1    Jan. 26, 2012

Related U.S. Application Data

(60) Provisional application No. 61/167,012, filed on Apr. 6, 2009, provisional application No. 61/218,648, filed on Jun. 19, 2009.

(51) Int. Cl.
| | | |
|---|---|---|
| C11D 3/12 | (2006.01) | |
| C11D 3/08 | (2006.01) | |
| C11D 3/10 | (2006.01) | |
| C11D 17/06 | (2006.01) | |
| C11D 7/10 | (2006.01) | |
| C11D 7/12 | (2006.01) | |
| C11D 7/14 | (2006.01) | |
| C11D 7/16 | (2006.01) | |
| C11D 7/20 | (2006.01) | |
| C01B 33/12 | (2006.01) | |
| C11D 3/04 | (2006.01) | |

(52) U.S. Cl.
CPC .......... *C11D 3/124* (2013.01); *C11D 3/046* (2013.01); *C11D 3/08* (2013.01); *C11D 3/10* (2013.01); *C11D 7/20* (2013.01); *C11D 7/10* (2013.01); *C11D 7/12* (2013.01); *C11D 7/14* (2013.01); *C11D 7/16* (2013.01); *C11D 17/06* (2013.01); *C01B 33/126* (2013.01); *C01B 33/128* (2013.01)
USPC .......... 510/511; 510/512; 510/513; 423/335; 423/339; 423/202; 423/326

(58) Field of Classification Search
CPC .......... C11D 17/06; C11D 3/046; C11D 3/08; C11D 3/10; C11D 3/124; C11D 7/20; C11D 7/10; C11D 7/12; C11D 7/14; C11D 7/16; C01B 33/126; C01B 33/128
USPC .......... 510/513, 511, 512; 423/202, 326, 335, 423/339
See application file for complete search history.

(56) References Cited

U.S. PATENT DOCUMENTS 3,857,925 A * 12/1974 Sirianni et al. ............... 423/339
4,678,652 A *  7/1987 Tamenori et al. ............ 423/339
(Continued)

FOREIGN PATENT DOCUMENTS

| CN | 1486280 | 3/2004 | |
|---|---|---|---|
| GB | 800 748 | 9/1958 | ............ C01B 33/193 |

(Continued)

OTHER PUBLICATIONS

International Preliminary Report on Patentability and Written Opinion ; PCT/US2010/029904; pp. 8, Oct. 20, 2011.
(Continued)

*Primary Examiner* — Lorna M Douyon

(74) *Attorney, Agent, or Firm* — Baker Botts L.L.P.

(57) ABSTRACT

The current disclosure relates to a silica-based particle containing at least approximately 5% silica by solid weight, at least approximately 15% alkali metal salt by solid weight; and at least approximately 15% water by total weight. Another embodiment of the disclosure relates to a detergent containing a silica/alkali metal salt particle and also containing at least a surfactant. Still another embodiment relates to a method of producing a silica/alkali metal salt particle. According to the method, one may combine a metal silicate and an amount of at least one acid source sufficient to form silica from the silicate and at least one alkali metal salt from the metal and acid, precipitate the silica to form precipitated silica, and, without washing the precipitated silica to remove the alkali metal salt, form a particle comprising the precipitated silica and at least approximately 15% alkali metal salt by solid weight.

6 Claims, 3 Drawing Sheets

(56) References Cited

U.S. PATENT DOCUMENTS

| | | | |
|---|---|---|---|
| 5,618,642 A * | 4/1997 | Samii et al. | 429/247 |
| 5,814,597 A * | 9/1998 | Raehse et al. | 510/511 |
| 5,871,867 A * | 2/1999 | Rausch et al. | 429/247 |
| 5,872,176 A * | 2/1999 | Hergenrother et al. | 524/494 |
| 6,180,710 B1 * | 1/2001 | Hergenrother et al. | 524/494 |
| 7,267,814 B2 * | 9/2007 | McGill et al. | 424/49 |
| 7,303,742 B2 * | 12/2007 | McGill et al. | 424/49 |
| 7,306,788 B2 * | 12/2007 | McGill et al. | 424/49 |
| 2003/0003040 A1 | 1/2003 | Lindner et al. | 423/335 |
| 2003/0157011 A1 * | 8/2003 | Mori | 423/335 |
| 2004/0062701 A1 | 4/2004 | Valero et al. | 423/339 |
| 2004/0099029 A1 * | 5/2004 | Noda et al. | 71/62 |
| 2006/0110307 A1 * | 5/2006 | McGill et al. | 423/338 |
| 2006/0110336 A1 * | 5/2006 | McGill et al. | 424/49 |
| 2006/0110339 A1 * | 5/2006 | McGill et al. | 424/49 |
| 2007/0224133 A1 * | 9/2007 | McGill | 424/49 |

FOREIGN PATENT DOCUMENTS

| | | | |
|---|---|---|---|
| KR | 2005082469 A * | 8/2005 | |
| WO | 02/053497 | 7/2002 | C01B 33/193 |

OTHER PUBLICATIONS

Chinese Office Action; Application No. 201080015007; pp. 8, Aug. 3, 2012.

International Search Report and the Written Opinion of the International Searching Authority for International application No. PCT/US2010/029904, 14 pages, Mailing Date Jun. 25, 2010.

European Office Action; Application No. 10711979.4-1357; pp. 5, Jun. 18, 2013.

Chinese Office Action and English translation; Application No. 201080015007.0; Pgs. 5, Dec. 18, 2013.

Mexican Office Action with English Translation; Application No. MX/a/2011/010509; Pgs. 7, Feb. 4, 2014.

Australian Examination Report; Application No. 2010234643; Pgs. 4 Feb. 14, 2014.

* cited by examiner

SILICAS AND ALKALI METAL SALT COMPOSITIONS, DETERGENTS FORMED FROM SUCH COMPOSITIONS AND METHOD OF FORMING SUCH COMPOSITIONS AND DETERGENTS

CROSS-REFERENCE TO RELATED APPLICATIONS

This application is a U.S. national stage application of International Application No. PCT/US2010/029904 filed Apr. 5, 2010, which designates the United States of America and claims the benefit of U.S. Provisional Application No. 61/167,012 filed on Apr. 6, 2009, entitled "Silicas and Alkali Metal Salt Compositions, Detergents Formed from such Compositions and Method of Forming Such Compositions and Detergents" and U.S. Provisional Application No, 61/218,648 filed on Jun. 19, 2009, entitled "Silicas and Alkali Metal Salt Compositions, Detergents Formed from such Compositions and Method of Forming Such Compositions and Detergents," which are all incorporated herein in their entirety.

TECHNICAL FIELD

The present disclosure relates, in some embodiments to compositions containing both silica and alkali metal salts. These compositions may be in the form of precipitated amorphous silica/alkali metal salt particles. The disclosure also relates to methods of forming such particles. The disclosure further relates to methods of making detergents using the silica/alkali metal salt compositions and the detergents made using these methods. In specific embodiments, the silica/alkali metal salt compositions may be used in detergents, particularly dry detergents. Such detergents may have high carrying capacity and may exhibit other useful properties such as good detergent agglomeration and caking properties.

BACKGROUND

Detergents are chemical agents useful for cleaning and found in many household items such as laundry and dish detergents. Detergents are usually provided as either a dry powder or as a liquid. Although some detergent components, such as surfactants, tend to be present in both dry and liquid detergents, many components are different and the manufacturing processes to produce dry or liquid detergents tend to be different. For example, dry detergents are often formed by a process called agglomeration. In agglomeration, dry materials are bound together by a binder and then dispersed in particles of a desired size, density, or other properties. Thus dry detergents may benefit from ingredients that facilitate the agglomeration process. Alternatively, dry detergents may also be produced by a spray-drying process in which the ingredients are first mixed in a liquid form. Accordingly, dry detergents may also benefit from ingredients that are soluble and that otherwise facilitate the spray-drying process.

Another problem sometimes encountered by dry detergents is caking. Caking generally refers to the tendency of dry detergent granules to stick together and thus form a solid cake, instead of remaining independent granules. Caking can interfere with dry detergent production and use. For example, it may make it difficult for consumers to remove the detergent from its container for use. Accordingly, detergent ingredients that help prevent caking are desirable.

The ability of a dry detergent or other dry material to use water or other liquids as a structural component is often referred to as its carrying capacity. Carrying capacity also reflects the ability of the dry detergent or other dry material to carry high amounts of water or other liquids and still behave as a solid powder. Detergents having a higher carrying capacity may have lower amounts of other ingredients because they are replaced by the structural water and, as a result, these detergents may have a lower cost as well as other beneficial properties. Many currently available detergents do not have a high carrying capacity and at a liquid content (typically water and liquid surfactants) above 5% may experience decreases in quality. For example, carrying capacity and caking in detergents may be related because as the liquid content of a detergent exceeds the carrying capacity, the excess liquid not used in any structural manner may cause the granules of the detergent to stick together. Many detergents develop unacceptable levels of caking for this reason at liquid content above 5%. Further, at liquid contents above 5% many detergents that contain enzymes or bleaches (particularly percarbonates or perborates), undergo decomposition of those enzymes or bleaches due the availability of non-structural water or other liquids.

Soda ash (sodium carbonate) is sometimes used to increase the carrying capacity of detergents, among other functions. Soda ash may be light or ground to increase its surface area and thus its carrying capacity. The carrying capacity of ground soda ash is approximately 25-50% of its weight. The carrying capacity of unground soda ash is approximately 15-25% of its weight. Other materials used in detergents, such as sodium sulphate used in agglomeration, typically have a carrying capacity of approximately 10-20% of their weight.

Precipitated silica ($SiO_2$) may be used in detergents. Particles of the silica may improve detergent properties by helping with carrying capacity and agglomeration and by decreasing caking. Current silicas used in detergents are typically washed to remove various by-products of their production, such as alkali metal salts. Most alkali metal salts are removed, but for some uses, such as in battery technology, a salt content of 5-10%, particularly of sodium sulphate, may be allowed to remain. Products made with silicas may also not be as dense as is desirable, requiring additional packaging and space to transport and store the product. Accordingly, improved compositions containing silicas, particularly those useful in detergents, would be beneficial. Detergents having improvements in various properties described above are also desirable.

Silica-based compositions may also be used for a wide variety of other purposes. Accordingly, there is a need for different silica-based compositions that may serve these other purposes as well or better than current silica-based compositions. Commercially available synthetic silicas are typically derived by either a liquid phase or a vapor process. Silicas obtained by the vapor process are called fumed or pyrogenic silicas. Products obtained by liquid processes are categorized as silica gels or precipitated silicas.

Pyrogenic or fumed silicas are prepared by reacting silicon tetrachloride vapor with oxygen and hydrogen gas at high temperatures. These products have high external surface areas and differ from liquid phase-process silicas.

Silica gels are of two general types, hydrogels and aerogels. Hydrogels are typically prepared by reacting a soluble silicate such as sodium silicate with strong sulfuric acid. The gel is washed salt-free, dried, steam micronized, then classified. Aerogels are prepared from crude hydrogels by displacing the water content with an alcohol. The alcohol is then recovered by heating the gel.

Aerogels are lighter and fluffier than hydrogels because shrinkage of the gel structure is avoided during the drying process. Both types of gels tend to have very large surface areas, generally in the range of 300-1,000 m²/g and also have high porosities.

Precipitated silicas are generally formed using the process shown in FIG. 2, wherein a metal silicate and acid source are combined until silica precipitates. This silica is then washed to remove alkali metal salts and dried.

Precipitated silicas are often used as reinforcing fillers for styrene-butadiene rubber and other organic rubbers. They may also be used as fillers and extenders in toothpaste, as carrier for vitamins, as paper extenders and brighteners, and in other areas.

Accordingly, given the wide range of uses for precipitate silicas, new precipitated silica-based compositions may possibly be better suited for various uses.

SUMMARY

According to a particular embodiment, the current disclosure relates to a silica-based particle containing from approximately 5% to 85% silica by solid weight, from approximately 15% to 80% alkali metal salt by solid weight; and from approximately 15 to 70% water by total weight. In a more specific embodiment the alkali metal salt in the particle may be $Na_2SO_4$, $Na_2CO_3$, $Na_2SiO_3$, sodium tripolyphosphate, magnesium sulphate, and any combinations thereof.

Another embodiment of the disclosure relates to a detergent containing a silica/alkali metal salt particle as described above and also containing at least a surfactant.

Still another embodiment relates to a method of producing a silica/alkali metal salt particle such as one described above. According to the method, one may combine a metal silicate and an amount of at least one acid source sufficient to form silica from the silicate and at least one alkali metal salt from the metal and acid, precipitate the silica to form precipitated silica, and, without washing the precipitated silica to remove the alkali metal salt, form a particle comprising the precipitated silica and at least 15% alkali metal salt by solid weight.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION

Figure 1:
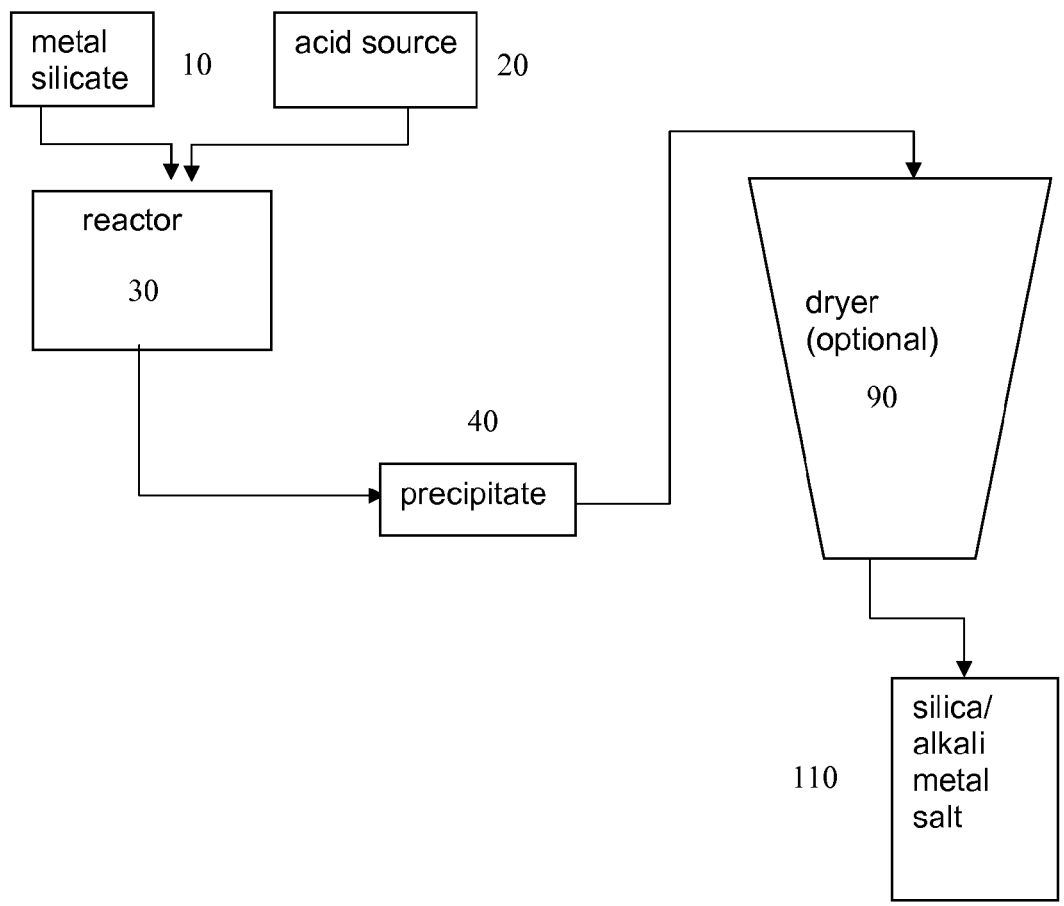
FIG. 1 illustrates a method of producing a silica/alkali metal salt particle according to an embodiment of the current disclosure.

Silica/alkali metal salt compositions according to embodiments of the present disclosure may be produced for a variety of uses, including as part of detergents. In one embodiment, they may take the form of particles containing silica and alkali metal salts. For example, the particles may contain silica and one or more of the following alkali metal salts: $Na_2SO_4$, $Na_2CO_3$, $Na_2SiO_3$, sodium tripolyphosphates, magnesium sulphates, and combinations of these salts.

According to a specific embodiment, both the particles and dry detergents or other dry materials made from them may have a high carrying capacity. Without limiting the disclosure to a specific mode of action, it is likely that the good carrying capacity of the particles of this disclosure may be at least partially due to the inclusion of silica and optionally also to the use of drying during particle formation, such as spray drying.

When particles according to the present disclosure are produced, a significant amount of the water content is in the form of structural water. Structural water is water that occupies the space within or between the silica/alkali metal salt particles. This water is effectively held within the particles. Accordingly, the ability of particles to hold water as structural water is directly related to their carrying capacity. In general, silicas able to hold a high weight percentage of water (e.g. from about 70-85%) are referred to a high structure silicas. Silicas only able to hold between about 50% to 70% weight percentage water are commonly referred to as low structure silicas. The total amount of structural water associated with 100 lbs. of solid silica content is defined as the "structure index" and is often abbreviated SI. Thus, silica/alkali metal salt particles of the current disclosure may have a high structure index. The structure index of silica-based particles is directly related to the functional properties and may be used to determine whether or not such particles are suitable for different uses, including use in detergents.

Silica/alkali metal salt particles according to embodiments of the current disclosure, may be produced initially with lower liquid content than their carrying capacity. The facilitates the later addition of liquids to the particles.

The amount of silica in the silica/alkali metal salt particles may be adjusted so as to achieve the desired carrying capacity in detergents containing the particles. In one embodiment, the amount of silica in the particle may be between approximately 5% and 90% by weight of solids, or more particularly between approximately 5% and 85% by weight of solids, or even more particularly between approximately 40% and 50% by weight of solids. In some embodiments the amount of silica may be at least 5% by weight of solids. The amount of alkali metal salts may be between approximately 15% and 90%, or more particularly between approximately 15% and 80% by weight of solids, or even more particularly between approximately 50% and 60% by weight of solids.

Carrying capacity may be as high as in silica particles containing little or no (i.e. lacking) alkali metal salts, such as silica particles made by traditional methods. For example, some particles of the current disclosure may have a carrying capacity of approximately 2:1 or higher, meaning that the particles can carry twice their own dry weight of water or other liquid. Expressed differently, the particles of the current disclosure may have a carrying capacity of approximately 200% based on weight. In some embodiments the carrying capacity may be as much as 2.5: or 250% based on weight or higher. Even at these high carrying capacities, the particles may still be highly resistant to caking. Detergents and other dry materials containing the particles of the current disclosure may exhibit similar carrying capacities. In some embodiments, detergents and other dry materials may exhibit a carrying capacity proportional to the amount of silica/alkali metal salt particle in the detergent or dry material.

The identity and amounts of the alkali metal salt in the silica/alkali metal salt particles may vary. For example, the alkali metal salt may be chosen to confer desirable properties to the particles. The alkali metal salt may also be chosen to avoid undesirable properties, such as loss of ability to carry surfactant. Detergents containing $Na_2SO_4$, $Na_2CO_3$, or $Na_2SiO_3$ have all demonstrated an approximately equal ability to carry surfactant. Accordingly, specific relative amounts of these alkali metal salts may not be required to achieve desirable carrying capacity for liquid surfactants.

Silica/alkali metal salt particles according to embodiments of the present disclosure may have a variety of desirable properties in addition to carrying capacity. These properties are discussed below. It will be understood by one of skill in the art that not all particles need have each desirable property and that the amount of silica and alkali metal salts in the particles as well as the identity and relative amounts of alkali metal salts may be adjusted to achieve variations in these properties just as they may be adjusted to achieve variations in carrying capacity.

Particles according to the present disclosure may be high density particles. For example, silica particles containing little or no alkali metal salts may have a density of only 100-150 g/L, whereas a particle of the current disclosure may have a density of approximately 300 g/L. Without limiting the mode of action of this disclosure, it is likely that increases in density of the silica/alkali metal salt particles may be due to increased amounts of alkali metal salt.

Particles according to the current disclosure may also be used to produce stable agglomerates with low density and low caking. Generally, one or more of these properties may be improved as compared to detergents produced using silica particles having little or no alkali metal salts. Further, particles according to the present disclosure may be able to control dispersion during agglomeration even when they are not thoroughly dissolved in the detergent.

Particles according to the current disclosure may also exhibit improved solubility during the agglomeration process for producing detergents as compared to silica particles having little or no alkali metal salts. Without limiting the mode of action of this disclosure, it is likely that because silica is generally insoluble in water, improvements in solubility may be due to the increases in the relative amount of alkali metal salts.

Finally, particles according to the current disclosure may be cheaper than silica particles having little or no alkali metal salts. Silica is generally more expensive than alkali metal salts. Further, as described below, alkali metal salts are produced as a by-product during conventional manufacture of silica particles. Incorporating this by-product into the final product as opposed to purposefully removing it also helps decrease the cost of silica/alkali metal salt particles as compared to silica particles lacking alkali metal salts. Further, the ability of high structure silica particles according to the current disclosure to bind additional water as a structural element may reduce the need for other more costly ingredients in detergents, such as sodium sulphate and thereby further reduce detergent cost. Particles according to the current disclosure may be only one eighth to one half the cost of conventional silica particles containing little or no alkali metal salts.

Further, as discussed above, silica/alkali metal salt particles of the current disclosure may be able to incorporate a high water content when used in a detergent containing enzymes or bleaches without causing degradation of the enzymes or bleaches. Soda ash and other ingredients affecting carrying capacity are unable to carry as much water without degrading enzymes or bleaches and thus detergents with only these ingredients may require additional enzymes or bleaches as compared to detergents containing silica/alkali metal salt particles, making those detergents more expensive. Additionally, in some embodiments the silica/alkali metal salt particles of the current disclosure may be used to carry some liquid bleaches or other liquid components of detergents, such as liquid surfactants. Silica/alkali metal salt particles may provide a protective function for such liquids that they may carry.

In particular embodiments, silica/alkali metal salt compositions of the present disclosure may contain between approximately 15% and 70% water by total weight, or less than approximately 70% water by total weight. The compositions may contain less water or other liquids than their carrying capacity.

Silica/alkali metal salt compositions of the present disclosure may be formed using any available methods. However, one specific method that may be particularly useful because it employs elements from current methods of producing silica particles and thus may be implemented using existing infrastructure.

In this example method shown in FIG. 1, precipitated silica/alkali metal salt particles are produced by the de-stabilization and precipitation of silica from soluble silicate by the addition of a mineral acid or acidic gas. A similar method used previously to produce silica particles is shown in FIG. 2.

The initial reactants include an alkali metal silicate 10, such as sodium silicate, and a mineral acid, such as sulfuric acid, or acidification agent, such as carbon dioxide ($CO_2$) 20. These reactants are combined in a reactor 30 under alkaline conditions able to cause precipitation of the silica. Generally, when the acidification agent is added to the alkali metal silicate, silica begins to precipitate. The addition of the acidification agent may be continued until the $M_2O$ (wherein M represents metal) is less than about 1% by weight of starting $M_2O$ material. Thus, generally, the acidification agent is added to the alkali metal silicate to neutralize the alkali portion bound to the silicate anion. The precipitate 40 contains silica and alkali metal salts. The precipitate 40 is essentially equivalent to the wet cake in conventional processes.

The choice of reactor conditions, such as agitation, duration of precipitation, the addition rate and concentration of the reactants, the temperature of the reactants, and the pH of the reaction can all vary the properties of the silica precipitated. In general, formation of a gel stage may be avoided by stirring at elevated temperatures.

Figure 2:
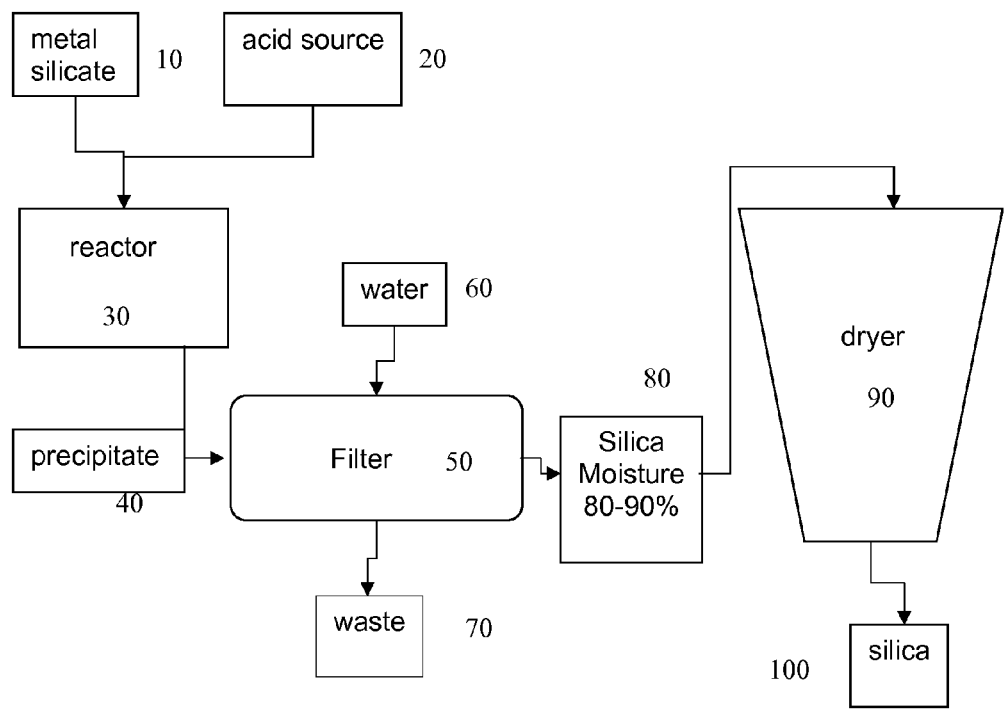
FIG. 2 illustrates a method of producing silica particles according to a prior art method.

After silica precipitation, in previous processes as show in FIG. 2, the precipitate 40 is moved to a filter 50 where it is washed with water 60 to remove all or substantially all alkali metal salts. For example, washing may continue until the precipitate contains only between 5% to 10% by weight sodium sulfate on a dry weight basis. The resulting silica particles 80, traditionally referred to as the wet cake, have a moisture content of between 80-90%. This moisture is removed in drying 90 to produce final silica particles having little or no alkali metal salts 100.

FIG. 1 shows how the process of one embodiment of the current disclosure differs from previous processes. In order to form silica/alkali metal particles of the current disclosure, precipitate 40 is not washed. Instead it is allowed to retain the alkali metal salts. Precipitate 40 is moved directly to dryer 90 for drying to form silica/alkali metal salt particles 110. Drying may occur for far less time than when silica particles are produced by the process in FIG. 2. In particular, spray drying may be used to dry precipitate 40. Without limiting the disclosure to a specific mode of action, the retention of alkali metal salts in the precipitate 40 prior to drying likely allows the alkali metal salts to become part of the structure of the final particles 110, thereby increasing their surface area and carrying capacity. Drying may continue until the final particles 110 have less water or other liquid than their carrying capacity. For example, drying may continue until the particles have between approximately 15% and 70% water by total weight, or until particles have less than approximately 70% water by total weight.

Use of unwashed precipitate 40 to form the final product 110 may also increase the yield of the overall process as compared the process in FIG. 2 where washing is employed.

In order to obtain particles having particular amounts of silica and alkali metal salts, as well as particular alkali metal salts in given proportions, one of ordinary skill in the art may also select the chemical identity of and adjust the amounts of starting materials 10 and 20. Additional chemicals may also be added during the precipitation stage or later to adjust the chemical composition of final product 110. For example, in an alternative embodiment, sodium-containing compounds, such as sodium sulfate, sodium carbonate, or sodium silicate liquid may be added to precipitate 40 to increase the alkali metal salt content to a desired level. Other materials may also be added to precipitate 40 to increase the alkali metal salt content or to produce other properties, such as detergent properties. For example, when making detergents from the silica/alkali metal salt particles, one may add sodium silicate liquid to the wet precipitate 40. Sodium tripolyphosphate (STPP), additional sodium sulphate, and magnesium sulphate may also be added. If additional water is desired in the final silica/alkali metal salt particles or at any point during the production process, it may be added particularly after precipitation.

In general, prior to drying, silica/alkali metal salt products may have a high water content. For example, silica produced in the process of FIG. 2 is commonly known to have between 80%-85% water by weight after washing. Precipitate 40 show in FIG. 1 would be expected to have similar at least amounts of water.

In general, the final product 110 of the example method may consist primarily of amorphous precipitated silica containing alkali metal salts. This amorphous precipitated silica may be essentially the precipitated aggregates of particles of colloidal amorphous silica that have not existed as a macroscopic gel during preparation. The size of the particles (aggregates) and their degree of hydration may vary.

The final product 110 may also, in some embodiments, have a higher specific pore volume than silica gels that have been pulverized due to a more open structure. However, the final product particles 110 may not necessarily have a higher specific surface area than gels as measured by the Brunauer, Emmett, Teller (BET) method (ASTM C 819-77, incorporated by reference in material part herein, using nitrogen as the adsorbate but modified by outgassing the system and sample for one hour at 180° C.).

Specifically, some particles made according to the method of FIG. 1 often have a BET surface are of between approximately 100 to 300 $m^2/g$. In particular, the BET surface area may be between 120 to 220 $m^2/g$.

The total intruded volume of a particle may correspond to the total volume of mercury that is intruded into a sample of particles during a high pressure scan (from about 103 kilopascals to about 227 megapascals absolute) divided by the mass of the sample tested. A high pressure scan may be conducted using an Autoscan mercury porosimeter (Quantachrome Corp.). Using this method, particles produced according to the methods of FIG. 1 often have a total intruded volume of between 1.9 to 3.2 $cm^3/g$.

Finally, DBP oil absorption of particles may be measured according to ASTM D 2414-93, incorporated by reference in material part herein, using dibutyl phthalate (CAS 84-74-2) as the adsorbate and a Type E Adsorptometer. Particles produced according to the method of FIG. 1 often have a DBP oil absorption of between about 180 to 320 $cm^3/100$ g. Frequently, the DBP oil absorption may be between about 190 to 270 $cm^3/100$ g. For detergent use, particles may be produced with a DBP oil absorption of between about 195 to 240 $cm^3/100$ g.

According to another embodiment of the current disclosure, a dry detergent may be made using silica/alkali metal salt particles described above. The silica/alkali metal salt particles may form between approximately 5% to 80% of the detergent by total weight, particularly between approximately 20% and 80% by total weight, more particularly between approximately 30% and 50% by total weight. Alternatively, silica/alkali metal salt particles may be less than approximately 80% of the detergent by total weight.

Detergents according to the present disclosure may contain any ingredients conventionally used or later introduced into detergents. Some common convention ingredients and their typical functions are described below:

The surfactant or surface active agent is typically present in every synthetic detergent formulation. The surfactant: 1) improves the wetting ability of water; 2) loosens and removes soil with the aid of wash action; 3) emulsifies, solubilizes or suspends soils in the wash solution. Most surfactants are organic compounds consisting of two parts: a water-loving (hydrophilic) portion and a water-hating (hydrophobic) portion. The water-hating ends attach themselves to the soil particles present in or on the fabrics being washed, while the water-loving ends are attracted to the water. The surfactant molecules surround the soil particles, break them up and force them away from the surface of the fabric, then suspend the soil particles in the wash water. Detergents may contain more than one kind of surfactant. These surfactants may differ in their ability to remove certain types of soil, in their effectiveness on different fabrics and in their response to water hardness. Surfactants are normally classified by their ionic (electrical charge) properties in the water.

Anionic surfactants are the most widely used. In water, their hydrophilic portion carries a negative charge, which can react in the wash water with the positively charged water hardness (calcium and magnesium) ions that tend to deactivate them. These surfactants are particularly effective at oily soil cleaning and clay soil suspension. But, to different degrees (depending on their chemical structure), they need help from other ingredients to prevent partial inactivation by water hardness ions.

Nonionic surfactants do not ionize in solution. Lack of charge enables them to avoid water hardness deactivation. They are especially good at removing oily type soils by solubilization and emulsification. Nonionic surfactants are frequently used in some low sudsing detergent powders. Nonionic surfactants may be mixed with anionic surfactants in some dry detergents.

Cationic surfactants carry a positive charge in water and do not react with positively charged water hardness ions. Cationic surfactants are used in fabric softeners and in a few combination fabric-conditioning detergents. In a properly balanced combination with nonionic surfactants, detergency may be achieved while depositing enough cationic surfactant on fabrics to produce softening and antistatic benefits.

Most surfactants in household laundry detergents manufactured for use throughout the United States are biodegradable.

The builder enhances or "builds" the cleaning efficiency of the surfactant by inactivating water hardness minerals. Builders tend to provide one or more of the following functions:

Soften water by tying up water hardness

Help prevent water hardness ions from interacting with negatively charged surfactants so surfactants can concentrate on soil removal Increase the efficiency of the surfactant system Most provide a desirable level of alkalinity, which aids cleaning Most disperse and suspend soils and prevent their redeposition Builders are typically used in general purpose laundry powders and liquids but not in light duty detergents (powders or liquids). Most builders soften water by sequestration, precipitation or ion exchange.

Sequestering builders, such as polyphosphates, inactivate water hardness mineral ions and hold them tightly in solution. Another builder, citrate, while not as strong a sequestrant as phosphate, contributes to detergency performance in some types of heavy duty liquid detergents.

A precipitating builder, such as sodium carbonate or sodium silicate, removes water hardness ions by a nonreversible reaction, forming an insoluble substance or precipitant. They are especially effective on calcium ions. Sodium carbonate and sodium silicate provide alkalinity to the detergent.

An ion exchange builder, such as aluminosilicate (zeolite), is an insoluble material which binds calcium hardness minerals.

Antiredeposition agents may be made from complex cellulosic materials such as carboxymethylcellulose (CMC), or synthetic materials such as polyethylene glycol and polyacrylates. They aid in preventing loosened soil from redepositing onto cleaned fabrics. Polyphosphate builders also help in reducing redeposition.

Corrosion inhibitors, usually sodium silicate, helps protect washer parts from corrosion.

Fluorescent whitening agents (FWAs or brighteners) are complex organic molecules which adhere to fabrics as though they were dyes. Ultraviolet energy is absorbed, converted and emitted as visible blue light to enhance fabric appearance and maintain whiteness or brightness.

Processing aids cover a considerable list of ingredients such as sodium sulfate, water, solvents like alcohol, or xylene sulfonate. They provide the product with the right physical properties for its intended use. Sodium sulfate, for example, helps provide crisp, free-flowing powders.

Colorants are added to lend an individuality to the product or dramatize a special additive contributing to product performance. Additionally, blue colorants may provide a bluing which imparts a desirable blue/white color to white fabrics.

Fragrances typically provide three functions, regardless of the scent used. They cover the chemical odor of the detergent and the odor of soils in the washing solution. Plus, they impart a pleasant scent to fabrics. Additionally, a fragrance contributes to the character of the product. Some detergents are offered in unscented versions, appealing to consumers who prefer low or no scent on laundry. They may also appeal to people whose skin is sensitive to fragrance ingredients.

Oxygen bleach provides the detergent with an all-fabric bleaching action for stain and soil removal. The most common agent used is sodium perborate tetrahydrate, but sodium percarbonate is also sometimes used. Recently, activated bleach systems have been introduced that provide effective fabric whitening at today's lower wash temperatures.

Enzymes aid in breaking down complex soils, especially proteins such as grass and blood, so that these soils can be more easily removed by other detergent ingredients.

Suds control agents are used as suds stabilizers or suppressors. Suds stabilizers are typically only used in detergents, such as light duty products, where lasting, voluminous suds are desirable. Suds suppressors inhibit sudsing or control it at a low level. Special long chain soaps are one class of compound used to control sudsing in powder laundry detergents.

Fabric softening agents impart softness and control static electricity in fabrics. Cationic surfactants (e.g., quaternary ammonium compounds) are commonly used.

Other ingredients may be added to a laundry detergent system to provide specialized performance or convenience.

Detergents according to the present disclosure may include dry products that are primarily detergents only or combination detergents. For example, combination laundry detergents often have a bleach alternative, color-safe bleach or fabric softener. The detergent/bleach combination products may utilize new technology which has provided more effective, low-temperature bleaching systems in response to the lower wash temperatures used in today's washloads.

Detergents including silica/alkali metal salt particles may include, but are not limited to, laundry detergent, dish detergent, dishwasher detergent, hand detergent, automotive detergent, industrial detergent, including detergent to remove particular chemicals such as particular greases or oils, antibacterial detergent, including detergent for hospital use, and laboratory detergents.

Silica/alkali metal salt particles may be readily incorporated in known manufacturing processes. According to one embodiment of the current disclosure, shown in FIG. 3, silica/alkali metal salt particles may be used in a spray tower method to form a dry detergent. In this process, the silica/alkali metal salt particles along with other detergent ingredients 200 may be dissolved in water to create a slurry. Other detergent ingredients may include, but are not limited to, surfactant such as linear alkylbenzene sulphonate (LAS), caustic soda, tripolyphosphates such as STPP, sodium silicate, and sodium sulphates. With a pump, the slurry is blown through nozzles inside the spray dryer tower as hot, dry air is simultaneously forced into the bottom of the cone. As the slurry dries, beads of dry detergent 240 fall to the bottom of the cone, where they are collected for packaging. The porosity and density of spray-dried detergents maybe controlled in part by the concentrations of the ingredients fed into the process. The lower the concentrations of the ingredients, the higher the porosity of the dried granules and the higher their carrying capacity.

Figure 3:
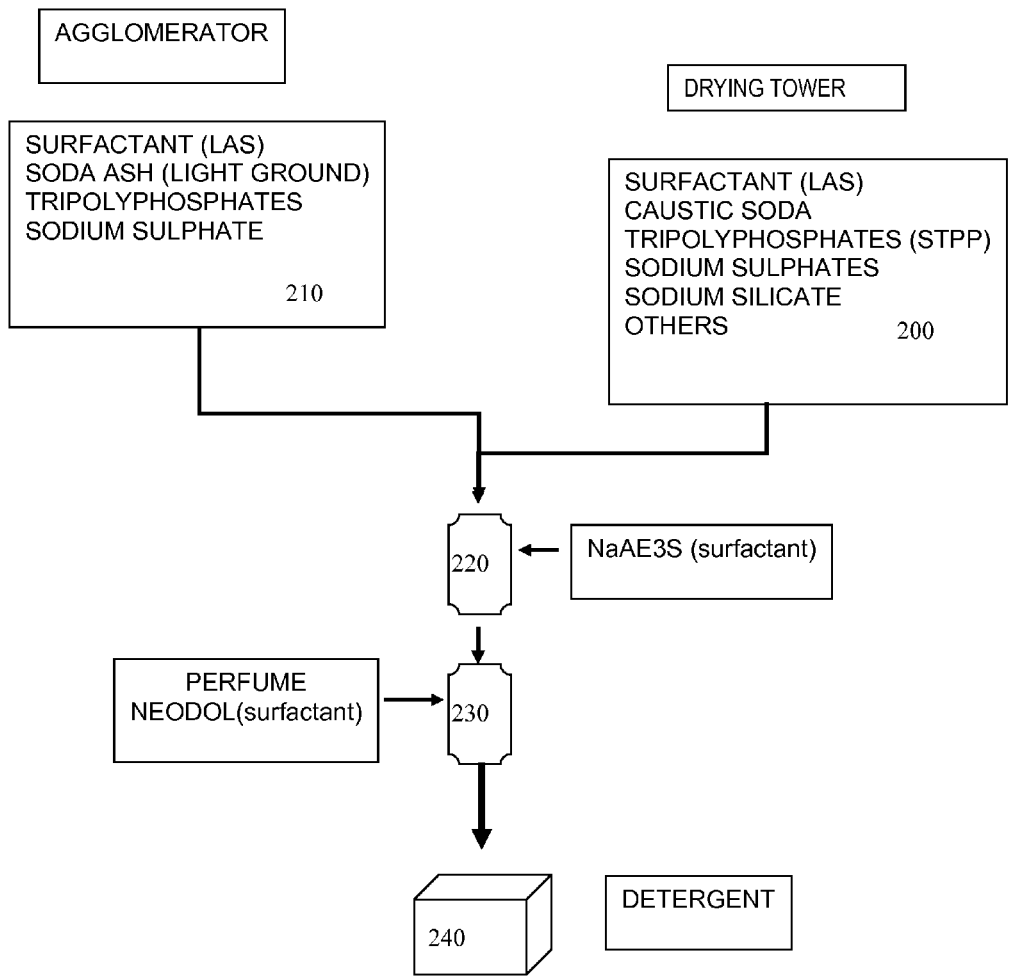
FIG. 3 illustrates a method of producing a detergent according to an embodiment of the current disclosure.

According to another embodiment of the current disclosure also shown in FIG. 3, silica/alkali metal salt particles may be used in an agglomeration method to form a dry detergent. In the process, the silica/alkali metal salt particles along with other detergent ingredients 210 are first fed into a large machine known as an agglomerator. Inside the agglomerator, sharp, whirling blades mix the dry material to a fine consistency. After the dry ingredients have been blended, liquid ingredients are sprayed on the dry mix through nozzles fitted into the agglomerator's walls. Liquid ingredients are included in ingredients 210. The total ingredients 210 in addition to the silica/alkali metal salt particles may include, but are not limited to, surfactant such as LAS, soda ash, such as light ground soda ash, tripolyphosphates, zeolytes (particularly in areas where phosphates are banned) and sodium sulphate. As discussed above, the silica/alkali metal salt particles of the current disclosure may have high water content. Under certain conditions, this water may be used to help dissolve some additional detergent ingredients or even potentially all ingredients except zeolytes. In particular, the water content may help dissolve sodium silicate and magnesium sulphate.

After spraying in the liquid ingredients, the resulting mixture leaves the machine and is typically dried. The drying step may be carried out in a wide variety of apparati, such as a fluid drying bed. The newly made detergent may then be pulverized and pushed through sizing screens that ensure that no large lumps of unmixed product remain in the final product 240. The result of this process is a dry detergent made up of granules of the original mixed detergent.

Both spray tower and agglomeration processes typically are continuous processes. In both factors that may be important in governing the density of the final detergent granules are the shape, porosity and particle distribution the granules, the density of the various starting materials, the shape of the various starting materials, and their chemical composition. The density of the granules may be adjusted to fit particular needs, but higher density granules may be desired, particularly if caking can be avoided, to allow more compact packaging. Alternatively, lower density granules may be desired for markets where compact packaging is not preferred.

Overall agglomeration tends to produce granules with have a higher density than those produced in a spray tower and that also have a lower porosity. Ground materials, particularly zeolytes, tend to have poor carrying capacity. Accordingly, these materials may not be able to increase the liquid load ability of detergents. Further, these materials may produce a detergent of such high density (700 g/L or higher) and low porosity that solubility of the detergent is poor.

Spray drying may produce detergents that have a higher porosity and surface area and as such are good carriers of liquids. Spray drying may, however, be more limited than agglomeration in its capacity to produce products having a high surfactant load.

Although spray drying and agglomeration are discussed as two separate processes above, combination processes employing elements of both may also use silica/alkali metal salts of the current disclosure to produce detergents. One example combined process is show in FIG. 3.

Granules from either spray drying or agglomeration may be subject to additional optional process steps such as those shown in FIG. 3. For example, additional surfactant such as NaAE3S or Neodol may be added. This addition may occur in one step or in two or more as shown in steps 220 or 230. Perfume may also be added as shown in example step 230.

In one example embodiment, the final detergent 240 density or detergent density after steps 200 or 210 may be between about 400 and 700 g/L, particularly between about 400 and 600 g/L, more particularly between about 450 and 500 g/L. One example of such a detergent before addition of materials in steps 220 or 230 may include approximately 30% by weight water, approximately 30% by weight surfactant, and approximately 40% by weight silica/alkali metal salt particle.

Although only exemplary embodiments of the invention are specifically described above, it will be appreciated that modifications and variations of these examples are possible without departing from the spirit and intended scope of the invention. For example, one of ordinary skill in the art will appreciate that a variety of alkali metal salts may be included in the silica particles and that all such salts are not specifically discussed above.

The invention claimed is:

1. A method of producing a silica/alkali metal salt particle comprising:
   combining a metal silicate and an amount of at least one acid source sufficient to form silica from the silicate and at least one alkali metal salt from the metal and acid;
   precipitating the silica to form precipitated silica, wherein the precipitating is carried out at an alkaline pH;
   without washing the precipitated silica to remove the alkali metal salt, drying a particle comprising the precipitated silica and at least approximately 50% alkali metal salt by solid weight.

2. The method according to claim 1, wherein the particle comprises at least approximately 15% water by weight.

3. The method according to claim 1, wherein the acid comprises a mineral acid.

4. The method according to claim 3, wherein the mineral acid comprises sulfuric acid.

5. The method according to claim 1, wherein the acid source comprises carbon dioxide.

6. The method according to claim 1, wherein the alkali metal salt is selected from the group consisting of $Na_2SO_4$, $Na_2CO_3$, $Na_2SiO_3$, sodium tripolyphosphate, magnesium sulphate, and combinations thereof.

* * * * *